(12) United States Patent
Cleveland

(10) Patent No.: US 7,367,738 B2
(45) Date of Patent: May 6, 2008

(54) APPARATUS AND METHOD FOR RELEASEABLY JOINING ELEMENTS

(75) Inventor: Mark Allen Cleveland, Westminster, CA (US)

(73) Assignee: The Boeing Company, Seattle, WA (US)

( * ) Notice: Subject to any disclaimer, the term of this patent is extended or adjusted under 35 U.S.C. 154(b) by 103 days.

(21) Appl. No.: 10/252,794

(22) Filed: Sep. 23, 2002

(65) Prior Publication Data

US 2004/0057787 A1 Mar. 25, 2004

(51) Int. Cl.
*F42B 15/38* (2006.01)
(52) U.S. Cl. .................. 403/31; 89/1.14; 102/378; 102/275.12; 403/290
(58) Field of Classification Search .......... 403/289, 403/290, 285, 34, 35, 38, 39, 31; 102/378, 102/275.12; 89/1.14; 244/121, 131
See application file for complete search history.

(56) References Cited

U.S. PATENT DOCUMENTS

| 3,366,916 A | * | 1/1968 | Oktay .................. 439/197 |
| 3,633,456 A | * | 1/1972 | Carr et al. .................. 89/1.14 |
| 3,698,281 A | * | 10/1972 | Brandt et al. .................. 89/1.14 |
| 3,971,580 A | * | 7/1976 | Tantlinger et al. .......... 292/201 |
| 4,220,389 A | * | 9/1980 | Schell .................. 439/197 |
| 4,370,011 A | * | 1/1983 | Suzuki et al. .............. 439/264 |
| 4,641,985 A | | 2/1987 | Bard et al. |
| 4,648,227 A | * | 3/1987 | Reusch .................. 52/419 |
| 4,685,376 A | | 8/1987 | Noel et al. |
| 4,879,941 A | * | 11/1989 | Repe et al. .................. 89/1.14 |
| 5,102,253 A | * | 4/1992 | Pugliesi-Conti et al. ....... 403/5 |
| 5,226,616 A | | 7/1993 | Butkiewicz |
| 5,312,152 A | | 5/1994 | Woebkenberg, Jr. et al. |
| 5,718,531 A | | 2/1998 | Mutschler, Jr. et al. |
| 5,722,709 A | | 3/1998 | Lortz et al. |
| 5,992,328 A | * | 11/1999 | Blain et al. .................. 102/378 |
| 6,126,115 A | | 10/2000 | Carrier et al. |
| 6,202,961 B1 | | 3/2001 | Wilke et al. |
| 6,298,786 B1 | | 10/2001 | Grosskrueger et al. |
| 2002/0014558 A1 | | 2/2002 | Holemans |

FOREIGN PATENT DOCUMENTS

| EP | 1 355 120 A1 | | 10/2003 |
| JP | 56069568 A | * | 6/1981 |
| WO | WO 9941176 A1 | * | 8/1999 |

* cited by examiner

*Primary Examiner*—James R. Brittain
(74) *Attorney, Agent, or Firm*—Alston & Bird LLP

(57) ABSTRACT

The apparatus and method for releasably joining first and second elements according to the present invention include a retaining member mounted to one of the elements and a reshapeable tube near the retaining member. The reshapeable tube has at least two states, an at least partially collapsed state and an at least partially expanded state. As such, the retaining member joins the elements while the reshapeable tube is in the at least partially collapsed state. Furthermore, the retaining member releases the other element while the reshapeable tube is in the at least partially expanded state, which deflects the retaining member. Thus, because components of the apparatus are not broken during the release of the elements, the amount of constrained or potential energy that is released when the retaining member releases the elements is substantially reduced or eliminated, which protects the elements from being damaged during the release.

24 Claims, 5 Drawing Sheets

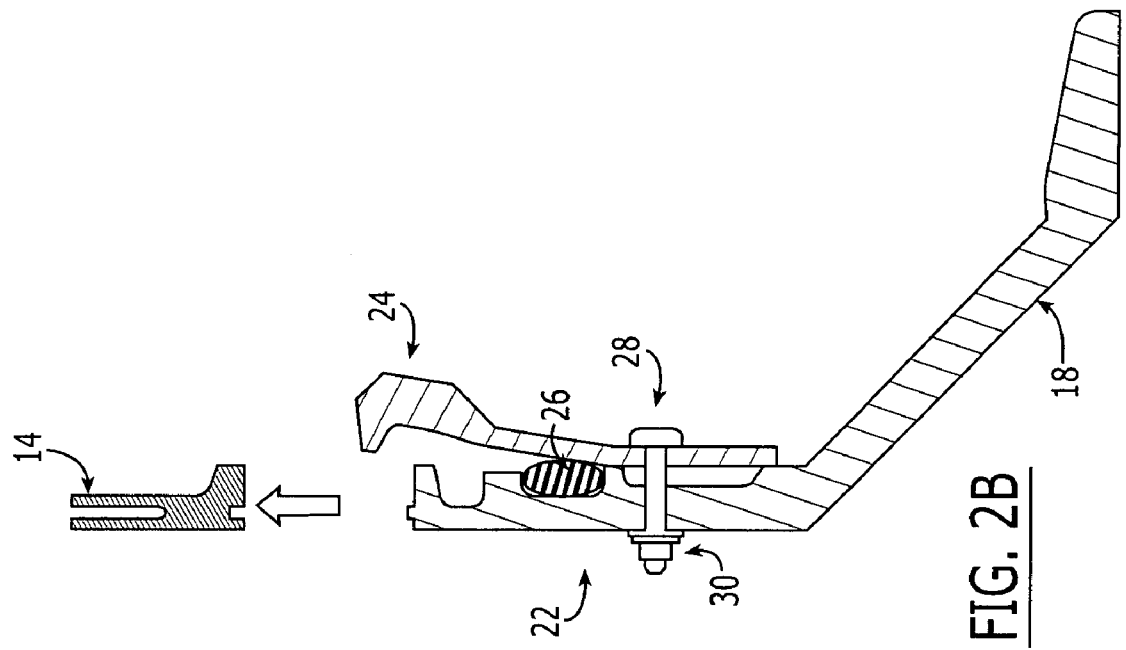
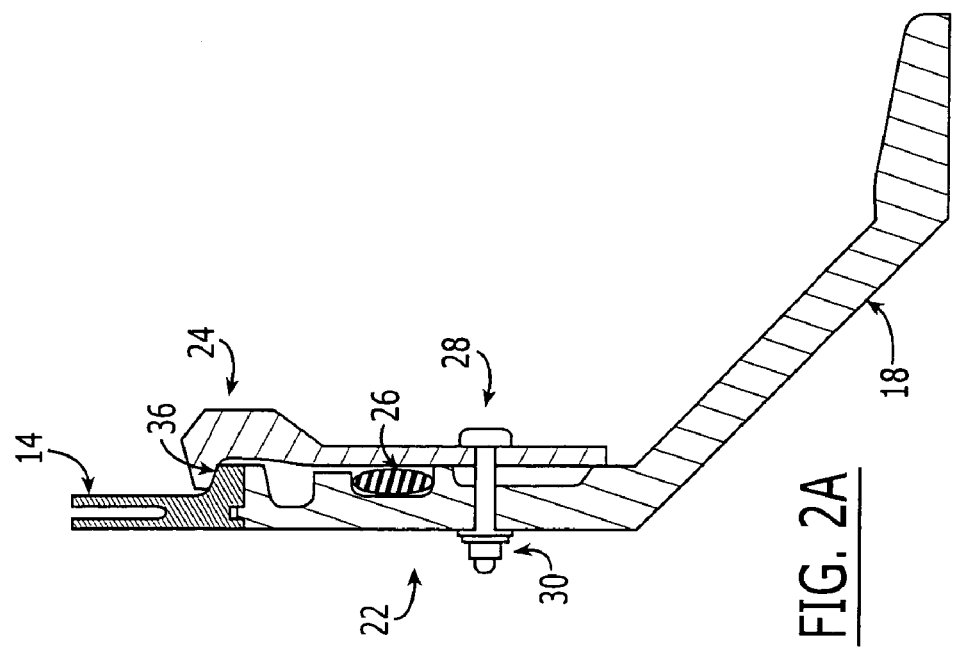

APPARATUS AND METHOD FOR RELEASEABLY JOINING ELEMENTS

BACKGROUND OF THE INVENTION

This invention is related to an apparatus and method for releaseably joining elements and, in particular, to an apparatus and method for releaseably joining elements with a clampband that is capable of releasing the elements without damaging the elements by reducing, if not eliminating, the release of constrained energy by the clampband that normally results in shock to the elements when the elements are released.

It is sometimes necessary to join various elements, at least temporarily, by clampbands. A clampband is generally made of one or more interconnected segments separated by respective openings. Typically, a connector, such as a bolt, extends across each opening in the clampband to allow the clampband to be tightened or loosened around the joined elements. The connector that extends across a respective opening may have various forms depending upon the application of the clampband. A commonly used clampband in the aerospace industry is referred to as a Marmon-type clampband.

To join elements, a clampband is placed around the abutting end portions of the elements and the clampband is tightened to exert enough tension to hold the elements together under the forces to which the elements are subjected. Typically, a respective fitting is mounted to the end portion of at least one element. Thus, the clampband can extend around and engage the fitting(s) so as to securely join the elements when subjected to the anticipated forces. The forces include, for instance, the weight of the elements and the forces exerted on the elements during their movement. For example, the clampband around the fitting must be tight enough to prevent the forces acting on the elements during movement from detaching the elements. In the aerospace industry, for instance, the elements joined by a clampband are generally heavy and subject to significant forces during movement, particularly during the take-off or launch. Specifically, a satellite launch vehicle, which is joined to a satellite by a clampband, is capable of lifting 2,000 to 31,000 pounds. In addition, the satellite and the launch vehicle are subject to significant forces during the launch process due to high inertial loads and acceleration of thrust. Thus, the connector that extends across the opening in the clampband utilized in satellite applications must tighten the clampband around the satellite and the launch vehicle to the extent necessary to securely join the elements and withstand the substantial forces acting thereupon.

In certain applications, clampbands are designed such that they may release the elements at a chosen time. The clampband release procedure may be manual or automated. To release the elements held by the clampband, the clampband must be loosened and/or opened in some manner. Typically, loosening and/or opening the clampband involves lengthening or detaching the connector that extends across the opening in the clampband. In the aerospace industry, for example, clampbands may be used to temporarily join launch vehicles to payloads, such that the launch vehicle may separate from the payload once it completes its function. Specifically, during the launch of a satellite, a clampband joins the satellite to the launch vehicle and once the launch vehicle transports the satellite to the desired location for orbit, the launch vehicle must separate from the satellite.

One conventional clampband separation method is to cut the connector that extends across an opening in the clampband. Typically, the clampband includes an automated cutter that is attached to a clampband segment, such that the connector may be cut and the clampband opened at a chosen time. At the time the connector is cut, the sudden release of constrained or potential energy stored in the clampband creates a low frequency shock in the elements due to the structural vibrations at the natural frequencies of elements. The tighter the clampband is applied to the fitting(s) between the elements, the higher the tension that is exerted by the clampband upon the fitting(s), and the larger release of constrained energy and corresponding shock experienced by the elements upon clampband separation. Thus, elements that are heavy and/or that are subject to significant forces during movement, which must be held together temporarily by a clampband, experience a large shock upon clampband separation because of the significant amount of constrained energy that is released when the tightened clampband is separated.

Another technique for releaseably joining elements includes a separation joint that engages the elements and that includes a tube capable of being reshaped in order to release the elements. The joint is connected to both elements in order to hold the elements together. The joint generally includes a pair of members that are brought together from opposite sides of the elements to secure the elements therebetween. The joint also includes a reshapable tube positioned between the joint members. The reshapable tube is initially substantially oval-shaped to permit the joint members to be brought together in order to secure the elements. The joint also includes a linear explosive assembly within the tube. In order to release the elements, the linear explosive assembly is detonated. This detonation creates pressure within the tube, which causes the tube to become substantially round. As the tube becomes round, it forces the joint members on either side of the tube to separate, which permits release of the elements. This technique, however, also creates a release of constrained energy when the tube causes the joint to break, which causes the elements to experience shock similar to that described above. In addition, this technique does not utilize the conventional clampband assembly, such that the joint may require more time and labor for installation than the conventional clampband assembly, which is typically readily available and utilizes known procedures for installation.

If the elements include or contain equipment that is sensitive to sudden movement, then the shock created upon clampband separation or joint breakage may damage the equipment, particularly if the clampband is tightly attached to the fitting(s) between the elements. The shock created upon clampband separation or joint breakage due to the release of constrained energy is particularly problematic for satellites, which contain highly sensitive sensors and antennas, in addition to other precision equipment. The shock may damage the sensitive and expensive electronics of the satellite, which may decrease the effectiveness of the satellite or render the satellite useless. In addition, in order to prevent the equipment from being damaged due to the clampband separation or joint breakage shock, the equipment must include protection, such as shock absorption means and the like, which increases the cost of the equipment.

The conventional low shock clampband separation techniques include provisions to attempt to mitigate the shock produced by conventional clampband separation techniques. One example of an attempt to mitigate the shock includes providing a slower manner of separating the conventional clampband. For example, instead of cutting a connector that extends across an opening in the clampband, a nut that holds the connector in the clampband may be rapidly spun off of the connector in order to open the clampband. An example of this type of clampband is commercially available from Saab-Ericsson Space AB. In the case of the Saab-Ericsson low shock clampband, this technique takes approximately four milliseconds, instead of the less than one millisecond that is required to cut the connector with a standard bolt cutter. Thus, the nut spinning technique reduces the shock experienced by the elements when the clampband is opened, but it still has significant shock content between 1,000 and 10,000 Hertz. In order to prevent damage to and reduce the risk of unexpected failure of sensitive equipment, the shock levels to the elements should be less than 100 g's between 1,000 and 10,000 Hertz. In addition, when the shock levels are less than 100 g's between 1,000 and 10,000 Hertz, the risk of failure of less expensive, off-the-shelf type components is reduced, and therefore may be used in the elements that are held together by the clampband, instead of costly components with significant amounts of built in protection to withstand larger shock levels. As such, even with the nut spinning clampband separation technique, an expensive protection means for the equipment is still required.

Thus, there exists a need in the industry for a low cost apparatus that utilizes the conventional clampband design, but also allows a gentle release of the elements held by the clampband. An apparatus that allows a reduction or substantial elimination of the source of the shock created by the release of constrained or potential energy stored in clampbands would substantially decrease the shock experienced by the elements joined by the clampband upon clampband separation and, therefore, reduce the risk of damage to sensitive equipment or electronics carried by the elements. In addition, reducing or substantially eliminating the constrained or potential energy stored in the clampband that creates low frequency vibrations in the elements upon clampband separation is desirable in order to reduce the risk of damage to sensitive equipment carried by the elements, such that elements with less protection may be utilized in particular applications, which can decrease the cost of the elements.

BRIEF SUMMARY OF THE INVENTION

The apparatus and method for releasably joining first and second elements of the present invention allow a gentle release of the elements by reducing or substantially eliminating the source of the shock experienced by elements that are joined using conventional techniques. The shock experienced by the elements upon release from the apparatus is reduced by substantially eliminating the release of constrained or potential energy stored in the apparatus. As such, there is less risk of damage to sensitive equipment or electronics carried by the elements when utilizing the apparatus and method of the present invention than when utilizing conventional techniques for releasably joining elements. In addition, the elements joined by the apparatus and method of the present invention require less protection because of the reduced risk of damage to sensitive equipment carried by the elements, which can decrease the cost of the elements. Furthermore, the apparatus and method of the present invention can utilize the conventional clampband design, such that minimal changes to a conventional clampband and/or the elements are required when the apparatus and method of the present invention are implemented in a clampband application.

The apparatus for releasably joining first and second elements includes a retaining member mounted to one of the elements and a reshapeable tube near the retaining member. The retaining member may engage the other element (i.e., the element to which the retaining member is not mounted) without being directly connected to the other element. In another embodiment of the apparatus of the present invention, the retaining member may define a recessed portion that is capable of receiving a portion of the other element. In this embodiment, the elements are joined by mounting the retaining member to one element, and receiving a portion of the other element in the recessed portion of the retaining member.

The reshapeable tube has at least two states, an at least partially collapsed state and an at least partially expanded state. As such, the retaining member joins the elements while the reshapeable tube is in the at least partially collapsed state. Furthermore, the retaining member releases one of the elements while the reshapeable tube is in the at least partially expanded state, which deflects the retaining member. To reshape the tube from the at least partially collapsed state to the at least partially expanded state, the reshapeable tube may include a tube and linear explosive assembly that reshapes the tube upon detonation. As the tube expands, it deforms or yields the material of the retaining member. Thus, because components of the apparatus are not broken during the release of the elements, the amount of constrained or potential energy that is released when the retaining member releases the elements is substantially reduced or eliminated, which protects the elements from being damaged during the release. For example, the apparatus and method for releasably joining elements may create substantially less than 500 g's between 1,000 and 10,000 Hertz when the retaining member releases the elements.

To mount the retaining member to one of the elements, at least one fastener may connect the retaining member to the element. If the embodiment of the apparatus includes a retaining member with a recessed portion, the reshapeable tube may be located between the fastener(s) and the recessed portion of the retaining member. The retaining member may be made of aluminum, titanium, magnesium, stainless steel or a combination of these metals. The reshapeable tube may be made of stainless steel.

A loosening element may be located proximate to the retaining member, such as the recessed portion of the retaining member, if applicable. The loosening element may partially release the elements from the retaining member prior to reshaping the reshapeable tube. Partially releasing the elements may further reduce or eliminate any release of constrained energy when the retaining member is deflected to release the elements.

The method for releasably joining elements includes mounting the retaining member to one of the elements such that the reshapeable tube is near the retaining member. In addition, the retaining member is mounted such that the recessed portion of the retaining member receives a portion of the other element to join the elements. The retaining member may be mounted to one of the elements by fastening a portion of the retaining member to the element at a mounting point, such that the reshapeable tube is located between the recessed portion and the mounting point.

The reshapeable tube then may be reshaped to move the recessed portion of the retaining member away from the elements, and the elements are therefore permitted to separate from one another. As discussed above, the reshapeable tube may be reshaped by detonating a linear explosive assembly located within the reshapeable tube. In addition, prior to reshaping the reshapeable tube, the recessed portion of the retaining member may be loosened from the elements.

Thus, the apparatus and method for releasably joining elements of the present invention securely join elements, but also are capable of gently releasing the elements at an appropriate time. The gentle release of the elements is afforded by the design of the retaining member and reshapeable tube, such that constrained or potential energy is not stored in the apparatus and, therefore, not released when a portion of the retaining member is deflected. As such, the elements are protected from the damage caused by the shock created by the release of constrained energy in conventional release techniques. In addition, the design of the retaining member and reshapeable tube match the shape of a conventional clampband, such that the retaining member and reshapeable tube may be substituted for the conventional clampband in applications that utilize such a clampband.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2A is a cross-sectional view of an apparatus for releasably joining elements, in which the elements are joined by the apparatus, according to one embodiment of the present invention;

FIG. 2B is a cross-sectional view of the apparatus for releasably joining elements of FIG. 2A, in which a portion of the apparatus has moved away from the elements, according to one embodiment of the present invention;

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The apparatus and method for releasably joining first and second elements of the present invention allow a gentle release of the elements by reducing or substantially eliminating the release of constrained or potential energy stored in the apparatus, which is the source of the shock experienced by elements that are joined using conventional techniques. Thus, the present invention is advantageous in many applications, such as clampband applications for releasably joining aerospace elements, because it is an economical technique to avoid excessive shock to the elements joined by the clampband upon clampband separation. This shock avoidance, therefore, prevents damage to equipment or electronics carried by the elements. In addition, the elements joined by the apparatus and method of the present invention require less protection because of the reduced risk of damage to sensitive equipment carried by the elements, which can decrease the cost of the elements. Furthermore, the apparatus and method of the present invention can utilize the conventional clampband design, such that minimal changes to a conventional clampband are required when the apparatus and method of the present invention are implemented in a clampband application.

Figure 1:
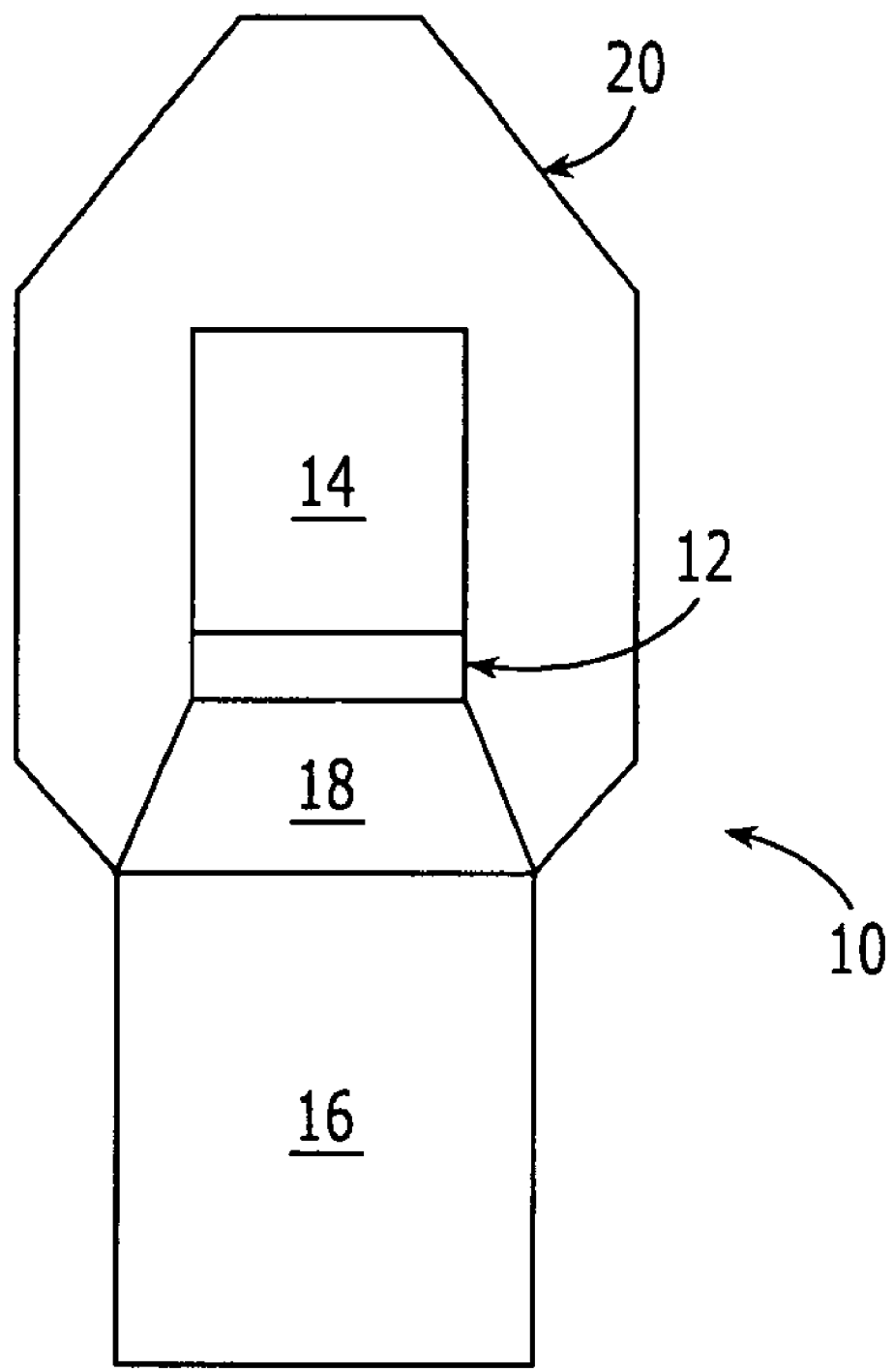
FIG. 1 illustrates a clampband that joins a satellite to a launch vehicle according to one embodiment of the present invention.

An apparatus for releasably joining first and second elements, such as a clampband assembly, may join together elements of a structure by surrounding end portions of the elements and, more commonly, fittings attached to end portions of the elements, with a band capable of securing the elements to prevent the elements from separating due to forces experienced by the elements, such as the forces due to the weight of the elements or the movement of the structure. For example, FIG. 1 illustrates the location of a clampband 12 that joins a first element 14, such as a satellite, to a launch vehicle 16 according to one embodiment of the present invention. In this embodiment, the second element 18, such as a payload attach fitting, provides the transition from the top of the launch vehicle 16 to the satellite. In other embodiments, such as when more than one satellite is to be launched, a dispenser may be used instead of the payload attach fitting. As such, the clampband 12 preferably engages the payload attach fitting or dispenser and the adjacent portion of the satellite. As shown in FIG. 1, a payload fairing 20 shields the satellite, i.e., element 14, from buffeting and aerodynamic heating while flying through the earth's atmosphere. Once the satellite launch structure 10 exits the earth's atmosphere, the satellite no longer needs the protection afforded by the payload fairing 20 and the payload fairing 20 separates from the satellite launch structure 10. The launch vehicle 16 proceeds to move the satellite to the desired orbit before detaching from the satellite through clampband separation. In this application, the clampband 12 must secure the satellite to the payload attach fitting or dispenser sufficiently to withstand the forces from the satellite inertial loads as the satellite launch structure 10 is propelled through the earth's atmosphere.

FIG. 2A illustrates a cross-sectional view of the apparatus 22 for releasably joining elements 14, 18 according to one embodiment of the present invention. Elements 14, 18 may be any type of elements that can be releasably joined. For example, element 14 may be a spacecraft, such as a satellite or a space shuttle, and element 18 may be a payload attach fitting or a dispenser for element 14. Thus, in the spacecraft application, the payload attach fitting or dispenser attaches the element 14 to a launch vehicle to facilitate movement of the elements to the appropriate location, as explained with respect to FIG. 1. As such, once the elements 14, 18 reach the appropriate location, such as a particular satellite orbit, there no longer exists a need for the launch vehicle and, therefore, there no longer exists a need for the elements to be joined. It is then advantageous for the elements to be capable of separation. While the apparatus is advantageous for spacecraft applications, other apparatus can also be utilized to join a wide variety of other elements, if so desired.

Figure 5A:
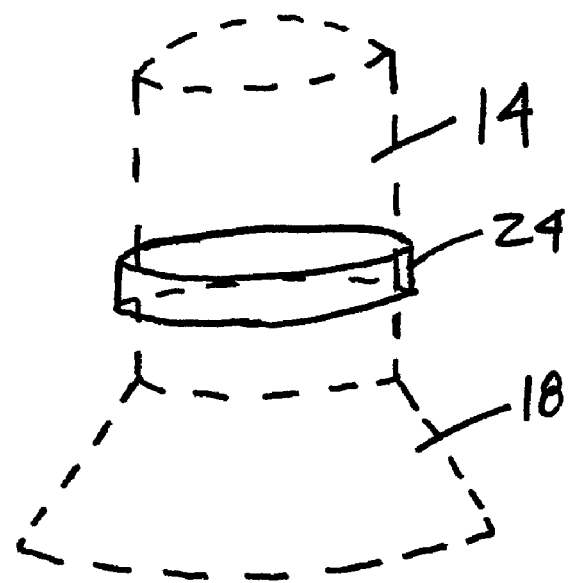
FIG. 5A depicts a retaining member extending completely circumferentially about the first and second elements in accordance with one embodiment of the present invention.
Figure 5B:
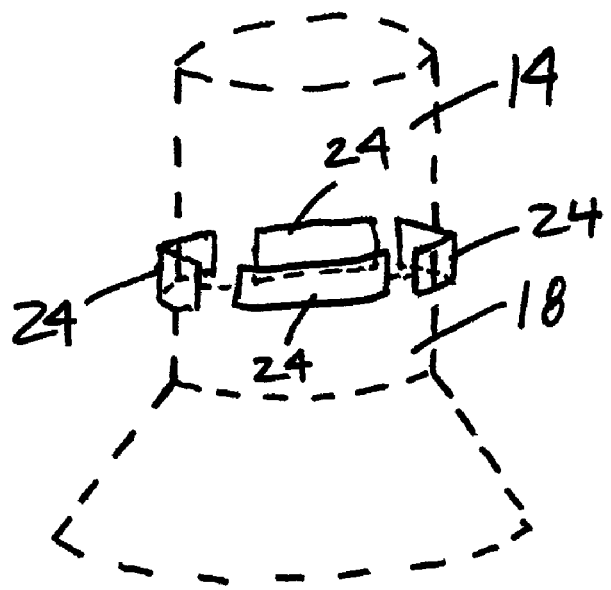
FIG. 5B depicts a plurality of retaining member segments that are spaced from one another circumferentially about the first and second elements in accordance with one embodiment of the present invention.

As shown in FIG. 2A, the apparatus 22 for releasably joining elements includes a retaining member 24 and a reshapeable tube 26, which may also be referred to as a clampband assembly. The retaining member 24 may be mounted to either of the elements 14, 18 in any manner known to those skilled in the art. For instance, as shown in the embodiment of FIG. 2A, the retaining member 24 may be mounted to element 18 with a fastener 28, such as a bolt, that extends through the retaining member 24 and the element 18 and that may be fixed in position with a nut or collar 30. The retaining member 24 surrounds at least a circumferential portion of the elements. In those embodiments in which the retaining member does not completely circumferentially surround the elements in the manner depicted in FIG. 5A, the retaining member 24 and, more specifically, at least that portion of the retaining member that will be deflected may be at least partially segmented to permit deflection, with segments of the retaining member spaced circumferentially about the elements. The segmented retaining member may be circumferentially spaced in any desired manner as shown in FIG. 5B so long as the segmented retaining member provides sufficient force to clamp the elements together prior to separation. For example, the retaining members may include four identical segments spaced evenly, such as at 90° increments, or unevenly about the circumference of the other elements.

In addition to being directly connected to one element, the retaining member 24 is adapted to engage the other element without being directly connected thereto. For example, the retaining member also may include a recessed portion 36 that is capable of receiving a portion, such as a lip or flange, of the other element, i.e., the element to which the retaining member 24 is not mounted. Thus, in FIG. 2A, where the retaining member 24 is mounted to the element 18, the recessed portion 36 of the retaining member 24 is capable of receiving a portion of element 14. As FIG. 2A illustrates, the retaining member may be mounted to one of the elements and may have a generally L-shaped hook-like shape for engaging the other element without similarly engaging the element to which the retaining member is mounted.

However, the retaining member may engage the elements in other manners. For example, in an alternative embodiment of the apparatus 22 of the present invention, as shown in FIG. 3A, the recessed portion 32 of the retaining member 24 may also be capable of receiving a portion of the element 18, in addition to receiving the portion of the element 14. Thus, for the embodiment of the apparatus 22 for releasably joining elements as shown in FIG. 3A, the recessed portion is sized to snugly receive portions of both elements, thereby permitting secure engagement of both elements. As before, the retaining member engages the other element without being directly connected to the other element.

Because the retaining member 24 may be partially or totally segmented, the elements 14, 18 may be any shape and the retaining member segment(s) may be placed about portions of the elements 14, 18 at appropriate locations to securely join the elements. Thus, unlike conventional clampband designs, it is not imperative that at least the portion of the elements joined by the retaining member have a circular-shaped interface in order to evenly distribute the tension of the clampband produced by the tightening of the explosive bolts. The retaining member 24 of the present invention can effectively and securely join elements of any shape because the retaining member segment(s) do not utilize circumferential tension to join the elements. Instead, the retaining member 24 applies force that urges the elements together, as described above.

In both of the embodiments shown in FIGS. 2A and 3A, the apparatus 22 also includes a reshapeable tube 26. The reshapeable tube 26 is proximate the retaining member 24. For example, in embodiments of the apparatus 22 of the present invention that include a retaining member 24 having a recessed portion 32, and that is mounted to one of the elements with a fastener 28, the reshapeable tube 26 may be located between the fastener 28 and the recessed portion 32 of the retaining member 24. As shown, the reshapeable tube 26 is disposed in a cavity defined by an element. However, the reshapeable tube 26 may, instead, be disposed within a cavity defined by the retaining member that faces the element or by a combination of aligned cavities defined by both the element and the retaining member. The reshapeable tube 26 may be continuous or segmented, depending upon the particular application or the placement of the retaining member segment(s).

The reshapeable tube is capable of being reshaped from an at least partially collapsed state to an at least partially expanded state. The reshapeable tube 26 shown in FIGS. 2A and 3A illustrates the partially collapsed state of the tube. Thus, the retaining member 24 engages the other element 14 while the reshapeable tube 26 is in the at least partially collapsed state. The reshapeable tube 26 shown in FIGS. 2B and 3B, however, illustrates the partially expanded state of the tube. Thus, the retaining member 24 is deflected while the reshapeable tube 26 is in the at least partially expanded state, which releases element 14 from the retaining member 24, and allows the elements 14, 18 to separate.

Figure 3B:
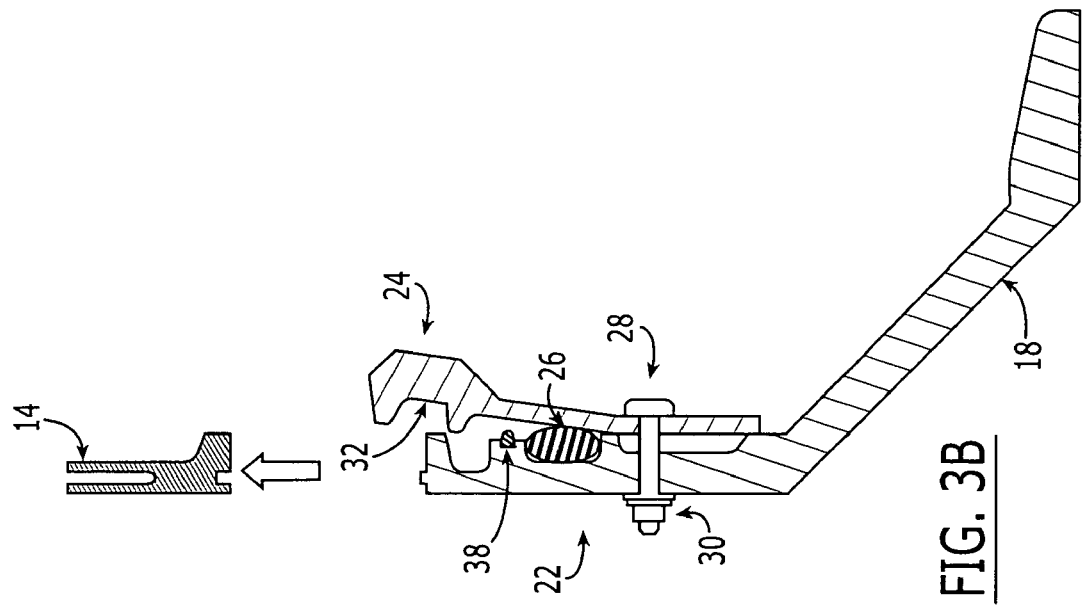
FIG. 3B is a cross-sectional view of the alternative embodiment of the apparatus for releasably joining elements of FIG. 3A, in which a portion of the apparatus has moved away from the elements.
Figure 3A:
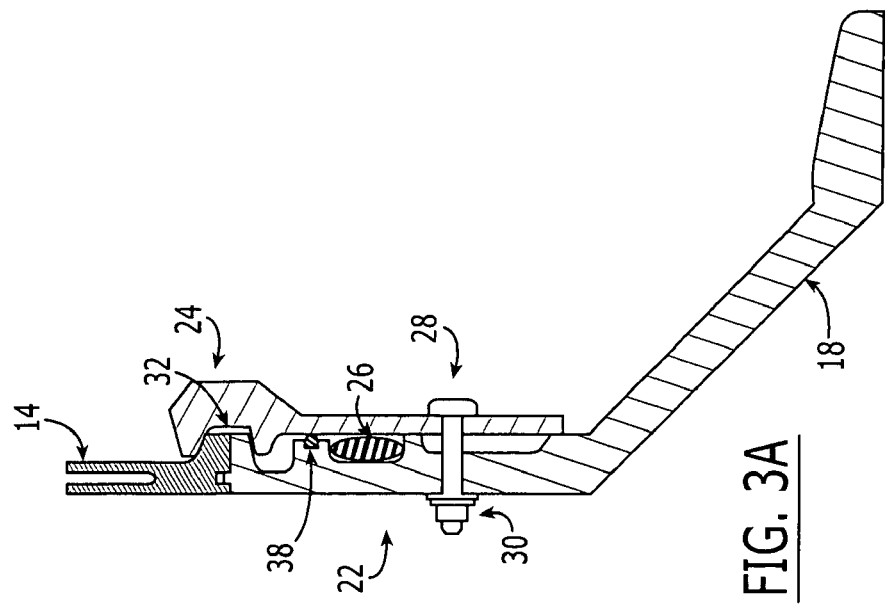
FIG. 3A is a cross-sectional view of an alternative embodiment of an apparatus for releasably joining elements, in which the elements are joined by the apparatus.

The retaining member 24 may be made of any type of material known to those skilled in the art that permits a distal portion of the retaining member 24 to be deflected from the elements, as shown in FIGS. 2B and 3B. For example, the retaining member 24 may be made of aluminum, titanium, magnesium, stainless steel or a combination of some or all of these.

The reshapeable tube 26 may be made of any type of material known to those skilled in the art that permits the tube to be reshaped from an at least partially collapsed state to an at least partially expanded state. For instance, the reshapeable tube 26 may be made of stainless steel. In addition, the tube may be reshaped by any means known to those skilled in the art. In one embodiment of the apparatus 22 of the present invention, the reshapeable tube 26 may include a tube and a linear explosive assembly that reshapes the tube from the at least partially collapsed state to the at least partially expanded state upon detonation. Such a reshapeable tube with a linear explosive assembly is described in U.S. Pat. No. 4,685,376, which is incorporated herein by reference.

Furthermore, the apparatus 22 for releasably joining elements of the present invention may include a loosening element to loosen the engagement of the retaining member to the element(s) prior to deflection of the retaining member. As shown in FIGS. 3A and 3B, the loosening element may be proximate the retaining element and, in particular, the loosening element 38 may be proximate the recessed portion 32 of the retaining member 24. In this regard, the loosening element 38 may be closer to the recessed portion than the reshapeable tube. As described in conjunction with the reshapeable tube, the loosening element 38 as shown is disposed in a cavity defined by an element. The loosening element 38 however, may, instead, be disposed within a cavity defined by the retaining member that faces the element or by a combination of aligned cavities defined by both the element and the retaining member.

The loosening element 38 may be made of any material known to those skilled in the art and may loosen the retaining member's engagement with the element(s) in any manner known to those skilled in the art. For example, the loosening element 38 may be a reshapeable tube of the same type as the reshapeable tube 26, but on a smaller scale. Thus, the loosening element 38 may have two states, an at least partially collapsed state, as shown in FIG. 3A, and an at least partially expanded state, as shown in FIG. 3B. Like the reshapeable tube 26, the loosening element may also include a tube and a linear explosive assembly that reshapes the tube upon detonation. As such, when the loosening element 38 is in the at least partially collapsed state, the retaining member 24 securely engages the element(s). When the loosening element 38 is in the at least partially expanded state, the distal portion of the retaining member 24 is slightly deflected, which, in turn, slightly loosens the engagement of the retaining member with the element(s). Thus, when the reshapeable tube 26 expands to further deflect the distal portion of the retaining member, the pre-loosening of the retaining member makes it easier to deflect. In addition, the pre-loosening of the retaining member further reduces or eliminates the constrained or potential energy in the retaining member that may be released when the distal portion of the retaining member is deflected completely out of engagement with the element(s). In embodiments of the present invention in which the loosening element 38 is included in a launch structure 10, partially releasing the retaining element 24 via the loosening element may also further reduce shock due to the separation of the payload fairing 20 from the elements 14, 18, and the launch vehicle 16, which precedes the separation of the elements 14, 18. The shock to the elements 14, 18 due to the separation of the payload fairing 20 may be reduced because slightly loosening the retaining element 24 allows the elements 14, 18 to move slight and to absorb at least a portion of the shock experienced at fairing separation.

Therefore, with or without the loosening element 38, the apparatus 22 for releasably joining elements of the present invention greatly decreases the shock experienced by the elements upon release from the retaining element 24, as compared to conventional apparatus for releasably joining elements. For example, conventional clampbands utilized to join elements for aerospace applications create over 500 g's between 1,000 and 10,000 Hertz, where g is a unit of measurement for the acceleration produced by the earth's gravity with 1 g being 32.2 ft/s$^2$. The apparatus 22 of the present invention, however, generally creates less than 500 g's between 1,000 and 10,000 Hertz when the element(s) are released by the retaining member 24. Preferably, the apparatus 22 of the present invention creates less than 100 g's between 1,000 and 10,000 Hertz. The apparatus 22 is capable of reducing or substantially eliminating the constrained energy that is experienced by the elements when they are released by the retaining member 24, because the retaining member 24 is not tightened about the circumference of the interface between the elements, and instead securely joins the elements by engaging portions of the elements and forcing the elements toward one another. Thus, to release the elements, the retaining member 24 is not cut or broken in order to release the tension in the retaining member 24, instead, the distal portion of the retaining member 24 may be gently deflected from the elements, which does not cause the elements to experience the release of much, if any, constrained or potential energy. Additionally, the apparatus of the present invention does not require the elements to be connected in any other fashion such that upon deflection of the retaining member, the elements are free to separate without having to break any portion of the elements as required by some conventional techniques.

Figure 4:
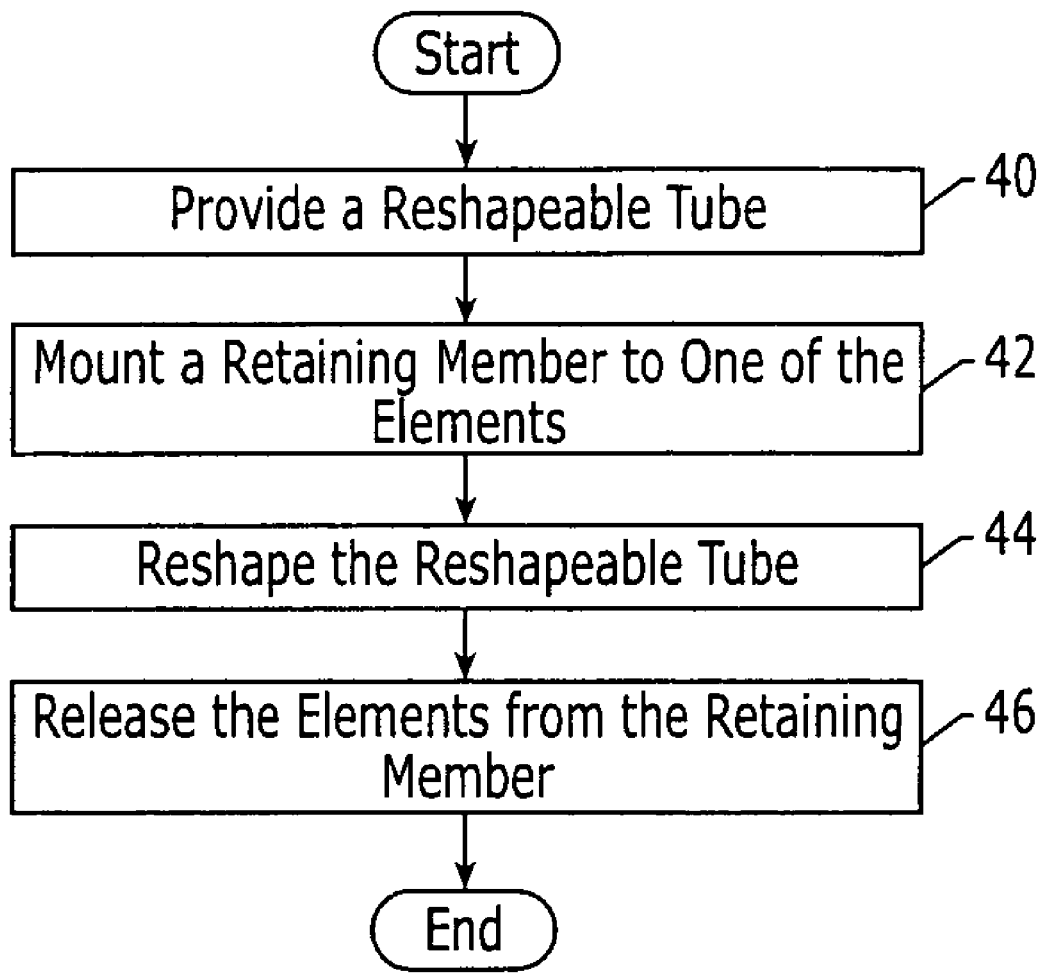
FIG. 4 is a flow diagram of a method for releasably joining elements, according to one embodiment of the present invention.

FIG. 4 illustrates a flow diagram of a method for releasably joining elements, according to one embodiment of the present invention. As step 40 illustrates, first a reshapeable tube may be provided. A retaining member may then be mounted to one of the elements to be joined, as shown in step 42. The retaining member may be mounted such that a recessed portion of the retaining member receives a portion of the other element, i.e., the element to which the retaining member is not mounted. In addition, the retaining member may be mounted such that the reshapeable tube is near the retaining member. As described above, the retaining member may be fastened to element at a mounting point, and the reshapeable tube may be positioned between the mounting point and the recessed portion of the retaining member.

In order to permit separation of the elements, the recessed portion of the retaining member may be loosened from the elements, if desired, as described above. The reshapeable tube then may be reshaped to move the recessed portion of the retaining member in a direction away from the elements, illustrated by step 44. As described above, the tube may be reshaped by detonating a linear explosive assembly that is located within the reshapeable tube, to change the state of the reshapeable tube from an at least partially collapsed state to an at least partially expanded state, which deflects the non-mounted portion of the retaining member from the element(s). Typically, the control signals that activate the loosening element, if any, and the reshapeable tube are provided by a control system, such as a controller onboard a satellite and/or a launch vehicle. However, the control signals may be provided in other manners, if so desired. Finally, as step 46 shows, the elements are released from the recessed portion of the retaining member. Thus, the process of reshaping the reshapeable tube to move the recessed portion of the retaining member away from the elements does not create a shock that is experienced by the elements and that is harmful to the elements, because little, if any, constrained energy is released when the retaining member moves away from the elements. As will be apparent to those skilled in the art, the elements may be released from the retaining member in other manners that include moving at least a portion of the retaining member away from the elements.

Overall, the apparatus and method for releasably joining elements of the present invention securely join elements, but also are capable of gently releasing the elements at an appropriate time. The gentle release of the elements is afforded by the design of the retaining member and reshapeable tube, such that constrained or potential energy is not stored in the apparatus or released upon element separation because the retaining member is not in tension about the circumference of the elements. Instead, the retaining member of the present invention creates a force to urge the element toward one another. Thus, the retaining member is securely in engagement with the elements while the reshapeable tube is in an at least partially collapsed state, but at least a portion of the retaining member is gently moved away from the elements when the reshapeable tube is in an at least partially expanded state. The elements are, therefore, protected from the damage caused by the shock created by the release of constrained energy in conventional release techniques. In addition, the design of the retaining member and reshapeable tube match the shape of a conventional clampband, such that the retaining member and reshapeable tube may be substituted for the conventional clampband in applications that utilize such a clampband.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A clampband for releasably joining first and second elements, comprising:
    a retaining member mounted to one of the first and second elements and defining a recessed portion for receiving a portion of the other element to thereby join the first and second elements, wherein the retaining member extends completely circumferentially about the first and second elements;
    a reshapeable tube proximate said retaining member and capable of being reshaped from an at least partially collapsed state to an at least partially expanded state such that the recessed portion of said retaining member engages the other element and joins the first and second elements while said reshapeable tube is in the at least partially collapsed state and further such that the recessed portion of said retaining member is deflected away from the first and second elements while said reshapeable tube is in the at least partially expanded state to release the other element; and
    at least one fastener for connecting said retaining member to one of the first and second elements while said reshapeable tube is in both the at least partially collapsed state and the at least partially expanded state,
    wherein the recessed portion of said retaining member is configured to be deflected relative to that portion of said retaining member connected to one of the first and second elements by said at least one fastener.

2. The clampband for releasably joining first and second elements according to claim 1, wherein said retaining member is made of at least one of aluminum, titanium, magnesium and stainless steel.

3. A clampband for releasably joining first and second elements comprising:
    a retaining member mounted to one of the first and second elements and defining a recessed portion for receiving a portion of the other element to thereby join the first and second elements, wherein the retaining member extends completely circumferentially about the first and second elements;
    a reshapeable tube proximate said retaining member and capable of being reshaped from an at least partially collapsed state to an at least partially expanded state such that the recessed portion of said retaining member engages the other element and joins the first and second elements while said reshapeable tube is in the at least partially collapsed state and further such that the recessed portion of said retaining member is deflected away from the first and second elements while said reshapeable tube is in the at least partially expanded state to release the other element; and
    at least one fastener for connecting said retaining member to one of the first and second elements,
    wherein the recessed portion of said retaining member is configured to be deflected relative to that portion of said retaining member connected to one of the first and second elements by said at least one fastener.

4. An apparatus for releasably joining first and second elements, comprising:
    a retaining member mounted to one of the first and second elements and defining a recessed portion for receiving a portion of the other element to thereby join the first and second elements;
    a reshapeable tube proximate said retaining member and capable of being reshaped from an at least partially collapsed state to an at least partially expanded state such that the recessed portion of said retaining member engages the other element and joins the first and second elements while said reshapeable tube is in the at least partially collapsed state and further such that said retaining member is deflected while said reshapeable tube is in the at least partially expanded state to release the other element; and
    a loosening element proximate the recessed portion of said retaining member to partially release the first and second elements from the recessed portion of said retaining member prior to reshaping said reshapeable tube.

5. An assembly comprising:
    first and second elements;
    a retaining member mounted to one of the first and second elements and defining a recessed portion for receiving a portion of the other element to thereby join the first and second elements, wherein the first and second elements are completely separable other than being joined by said retaining member;
    a reshapeable tube proximate said retaining member and capable of being reshaped from an at least partially collapsed state to an at least partially expanded state such that the recessed portion of said retaining member engages the other element and joins the first and second elements while said reshapeable tube is in the at least partially collapsed state and further such that said retaining member is deflected while said reshapeable tube is in the at least partially expanded state to release the other element such that the first and second elements completely separate from one another; and
    at least one fastener for connecting said retaining member to one of the first and second elements, wherein the recessed portion of said retaining member is configured to be deflected relative to that portion of said retaining member connected to one of the first and second elements by said at least one fastener.

6. A clampband for releasably joining first and second elements, comprising:
    a plurality of retaining member segments that are each mounted to one of the first and second elements and that each a recessed portion for receiving a portion of the other element to thereby join the first and second elements, wherein the plurality of retaining member segments are circumferentially spaced from one another about the first and second elements;
    a reshapeable tube proximate each retaining member segment and capable of being reshaped from an at least partially collapsed state to an at least partially expanded state such that the recessed portion of said respective retaining member segment engages the other element and joins the first and second elements while said reshapeable tube is in the at least partially collapsed state and further such that said respective retaining member segment is deflected while said reshapeable tube is in the at least partially expanded state to release the other element; and at least one fastener for connecting each retaining member segment to one of the first and second elements, wherein the recessed portion of each retaining member segment is configured to be deflected relative to that portion of said respective retaining member segment connected to one of the first and second elements by said at least one fastener.

7. The clampband for releasably joining first and second elements according to claim 1, wherein the clampband creates less than 500 g's between 1,000 and 10,000 Hertz when said retaining member releases the first and second elements.

8. A clampband for releasably joining first and second elements comprising:

a retaining member mounted to one of the first and second elements, wherein said retaining member engages the other element without being directly connected to the other element, wherein the retaining member extends completely circumferentially about the first and second elements;

a reshapeable tube proximate said retaining member and capable of being reshaped from an at least partially collapsed state to an at least partially expanded state such that said retaining member engages the other element while said reshapeable tube is in the at least partially collapsed state and further such that the portion of said retaining member that engages the other element is deflected away from said first and second elements while said reshapeable tube is in the at least partially expanded state to release the other element; and at least one fastener for connecting said retaining member to one of the first and second elements while said reshapeable tube is in both the at least partially collapsed state and the at least partially expanded state, wherein the portion of said retaining member that engages the other element is configured to be deflected relative to that portion of said retaining member connected to one of the first and second elements by said at least one fastener.

9. The clampband for releasably joining first and second elements according to claim 8, wherein said retaining member is made of at least one of aluminum, titanium, magnesium and stainless steel.

10. A clampband for releasably joining first and second elements comprising:

a retaining member mounted to one of the first and second elements, wherein said retaining member engages the other element without being directly connected to the other element, wherein the retaining member extends completely circumferentially about the first and second elements;

a reshapeable tube proximate said retaining member and capable of being reshaped from an at least partially collapsed state to an at least partially expanded state such that a portion of said retaining member engages the other element and joins the first and second elements while said reshapeable tube is in the at least partially collapsed state and further such that the portion of said retaining member that engages the other element is deflected away from the first and second elements while said reshapeable tube is in the at least partially expanded state to release the other element; and at least one fastener for connecting said retaining member to one of the first and second elements, wherein the portion of said retaining member that engages the other element is configured to be deflected relative to that portion of said retaining member connected to one of the first and second elements by said at least one fastener.

11. An apparatus for releasably joining first and second elements comprising:

a retaining member mounted to one of the first and second elements, wherein said retaining member engages the other element without being directly connected to the other element;

a reshapeable tube proximate said retaining member and capable of being reshaped from an at least partially collapsed state to an at least partially expanded state such that said retaining member engages the other element while said reshapeable tube is in the at least partially collapsed state and further such that said retaining member is deflected while said reshapeable tube is in the at least partially expanded state to release the other element; and a loosening element proximate said retaining member to partially release the first and second elements from said retaining member prior to reshaping said reshapeable tube.

12. An assembly comprising:

first and second elements;

a retaining member mounted to one of the first and second elements, wherein said retaining member engages the other element without being directly connected to the other element, wherein the first and second elements are completely separable other than being joined by said retaining member;

a reshapeable tube proximate said retaining member and capable of being reshaped from an at least partially collapsed state to an at least partially expanded state such that said retaining member engages the other element while said reshapeable tube is in the at least partially collapsed state and further such that said retaining member is deflected while said reshapeable tube is in the at least partially expanded state to release the other element such that the first and second elements completely separate from one another; and at least one fastener for connecting said retaining member to one of the first and second elements, wherein the portion of said retaining member that engages the other element is configured to be deflected relative to that portion of said retaining member connected to one of the first and second elements by said at least one fastener.

13. A clampband for releasably joining first and second elements comprising:

a plurality of retaining member segments that are each mounted to one of the first and second elements, wherein each retaining member segment engages the other element without being directly connected to the other element, wherein the plurality of retaining member segments are circumferentially spaced from one another about the first and second elements;

a reshapeable tube proximate each retaining member segment and capable of being reshaped from an at least partially collapsed state to an at least partially expanded state such that said respective retaining member segment engages the other element while said reshapeable tube is in the at least partially collapsed state and further such that said respective retaining member segment is deflected while said reshapeable tube is in the at least partially expanded state to release the other element; and at least one fastener for connecting each retaining member segment to one of the first and second elements, wherein the portion of each retaining member segment that engages the other element is configured to be deflected relative to that portion of said respective retaining member segment connected to one of the first and second elements by said at least one fastener.

14. The clampband for releasably joining first and second elements according to claim 8, wherein the apparatus creates less than 500 g's between 1,000 and 10,000 Hertz when said retaining member releases the first and second elements.

15. The clampband of claim 3 wherein said reshapeable tube is made of stainless steel.

16. The clampband of claim 3 wherein said reshapable tube is located between said at least one fastener and the recessed portion of said retaining member.

17. The apparatus of claim 4 wherein said retaining member extends at least partially about a periphery of the first and second elements.

18. The clampband of claim 6 wherein said reshapeable tube is made of stainless steel.

19. The clampband of claim 6 wherein said reshapeable tube is located between said at least one fastener and the recessed portion of said retaining member.

20. The clampband of claim 10 wherein said reshapeable tube is made of stainless steel.

21. The clampband of claim 10 wherein said reshapeable tube is located between said at least one fastener and the recessed portion of said retaining member.

22. The apparatus of claim 11 wherein said retaining member extends at least partially about a periphery of the first and second elements.

23. The clampband of claim 13 wherein said reshapeable tube is made of stainless steel.

24. The clampband of claim 13 wherein said reshapeable tube is located between said at least one fastener and the recessed portion of said retaining member.

* * * * *